(12) United States Patent
Parann-Nissany et al.

(10) Patent No.: US 9,380,036 B2
(45) Date of Patent: Jun. 28, 2016

(54) METHODS AND DEVICES FOR SECURING KEYS FOR A NONSECURED, DISTRIBUTED ENVIRONMENT WITH APPLICATIONS TO VIRTUALIZATION AND CLOUD-COMPUTING SECURITY AND MANAGEMENT

(71) Applicant: Porticor Ltd., Ramat Hasharon (IL)

(72) Inventors: Gilad Parann-Nissany, Ramat Hasharon (IL); Yaron Sheffer, Tel Aviv (IL)

(73) Assignee: Porticor Ltd., Hod Hasharon (IL)

( * ) Notice: Subject to any disclaimer, the term of this patent is extended or adjusted under 35 U.S.C. 154(b) by 0 days.

(21) Appl. No.: 13/820,815

(22) PCT Filed: Nov. 28, 2012

(86) PCT No.: PCT/IL2012/050483
§ 371 (c)(1),
(2) Date: Mar. 5, 2013

(87) PCT Pub. No.: WO2013/080204
PCT Pub. Date: Jun. 6, 2013

(65) Prior Publication Data
US 2015/0143111 A1    May 21, 2015

Related U.S. Application Data

(60) Provisional application No. 61/563,893, filed on Nov. 28, 2011, provisional application No. 61/603,383, filed on Feb. 27, 2012.

(51) Int. Cl.
*H04L 9/08* (2006.01)
*H04L 29/06* (2006.01)
(Continued)

(52) U.S. Cl.
CPC .............. *H04L 63/06* (2013.01); *G06F 21/602* (2013.01); *G06F 21/6218* (2013.01);
(Continued)

(58) Field of Classification Search
CPC ........... H04L 9/08; H04L 9/085; H04L 9/008; G06F 21/06; G06F 21/602; G06F 21/62; G06F 21/6218
See application file for complete search history.

(56) References Cited

U.S. PATENT DOCUMENTS 6,192,472 B1 * 2/2001 Garay et al. ................... 713/165
6,577,734 B1 * 6/2003 Etzel ..................... H04L 9/0822
380/273

(Continued)

FOREIGN PATENT DOCUMENTS

WO    WO/2011050967 A1    5/2011

OTHER PUBLICATIONS

Gentry; Computing arbitrary functions on encrypted data; 2010; retrieved from the Internet<URL:http://dl.acm.org/citation.cfm?id=1666444>; pp. 1-9 as printed.*

(Continued)

*Primary Examiner* — Tae Kim
(74) *Attorney, Agent, or Firm* — Reuven K. Mouallem; FlashPoint IP Ltd.

(57) ABSTRACT

The present invention discloses methods and devices for securing keys for a non-secure computing-environment. Methods include the steps of: providing a security-key framework which is adapted, upon receiving an encryption request for protecting a secret item, for repetitively encrypting the secret item with each of a set of N location-specific secure-keys, wherein each location-specific secure-key corresponds to a respective encryption location, to create an encrypted item; wherein the locations are regions of memory located in computing resources operationally connected to the computing-environment; and concealing through encryption at least one location-specific secure-key such that the concealing is configured: to prevent at least one location-specific secure-key from ever being known in an unconcealed form on any computing resource in any computing-environment during the encrypting; and to allow mathematical operations, performed as part of the encrypting and concealing, to be performed while at least one location-specific secure-key is in its concealed form.

18 Claims, 4 Drawing Sheets

(51) Int. Cl.
*G06F 21/60* (2013.01)
*G06F 21/72* (2013.01)
*G06F 21/62* (2013.01)
*H04L 29/08* (2006.01)
*H04L 9/00* (2006.01)

(52) U.S. Cl.
CPC ............... *G06F 21/72* (2013.01); *H04L 9/008* (2013.01); *H04L 9/085* (2013.01); *H04L 9/0822* (2013.01); *H04L 9/0894* (2013.01); *H04L 67/10* (2013.01); *G06F 2221/2111* (2013.01); *G06F 2221/2149* (2013.01); *H04L 2463/062* (2013.01)

(56) References Cited

U.S. PATENT DOCUMENTS

| | | | | |
|---|---|---|---|---|
| 6,636,968 | B1* | 10/2003 | Rosner et al. | 713/178 |
| 7,325,141 | B2* | 1/2008 | Chow | G06F 21/31 |
| | | | | 713/150 |
| 7,738,660 | B2* | 6/2010 | Scheidt | H04L 9/0869 |
| | | | | 380/258 |
| 8,050,410 | B2* | 11/2011 | Sanders et al. | 380/278 |
| 8,468,368 | B2* | 6/2013 | Gladwin | G06F 21/6218 |
| | | | | 380/277 |
| 8,538,029 | B2* | 9/2013 | Li et al. | 380/279 |
| 8,625,802 | B2* | 1/2014 | Parann-Nissany | G06F 21/602 |
| | | | | 380/277 |
| 2007/0014406 | A1* | 1/2007 | Scheidt | H04L 9/0869 |
| | | | | 380/258 |
| 2010/0299313 | A1* | 11/2010 | Orsini et al. | 707/652 |
| 2011/0161655 | A1* | 6/2011 | Gladwin | G06F 21/6218 |
| | | | | 713/150 |
| 2011/0311055 | A1* | 12/2011 | Parann-Nissany | G06F 21/602 |
| | | | | 380/278 |
| 2012/0260092 | A1* | 10/2012 | Girao et al. | 713/168 |
| 2013/0246812 | A1* | 9/2013 | Resch | G06F 21/6218 |
| | | | | 713/193 |
| 2013/0275746 | A1* | 10/2013 | Gladwin | G06F 21/6218 |
| | | | | 713/153 |

OTHER PUBLICATIONS

Martin et al.; Distributing the Encryption and Decryption of a Block Cipher; 2005; Retrieved from the Internet <URL:link.springer.com/article/10.1007/s10623-003-1719-4>; pp. 1-25 as printed.*
Gentry, C., and Halevi, S., Implementing Gentry's Fully-Homomorphic Encryption Scheme. https://eprint.iacr.org/2010/520.pdf, Feb. 4, 2011, entire document.
Takabi, H., Joshi, J.B., and Ahn, G.J., Security and Privacy Challenges in Cloud Computing Environments. Security & Privacy, IEEE, 8(6) 24-31, http://www.sis.pitt.edu/~jjoshi/courses/IS2620/Spring11/cloud.pdf, Dec. 31, 2010, entire document.
Atayero, A., and Feyisetan, O., Security Issues in Cloud Computing: The Potentials of Homomorphic Encryption. Journal of Emerging Trends in Computing & Information Sciences, vol. 2, No. 10, pp. 546-552. http://eprints.covenantuniversity.edu.ng/912/1/vol2no10__11.pdf, Oct. 31, 2011, entire document.

* cited by examiner

METHODS AND DEVICES FOR SECURING KEYS FOR A NONSECURED, DISTRIBUTED ENVIRONMENT WITH APPLICATIONS TO VIRTUALIZATION AND CLOUD-COMPUTING SECURITY AND MANAGEMENT

CROSS REFERENCE TO RELATED APPLICATIONS

This patent application claims priority under 35 U.S.C. §119(e) to U.S. Provisional Patent Application No. 61/563,893 filed Nov. 28, 2011 and U.S. Provisional Patent Application No. 61/603,383 filed Feb. 27, 2012, and under 35 U.S.C. §365(a) to PCT Patent Application No. IL2012/050483 filed Nov. 28, 2012, which are hereby incorporated by reference in their entirety.

FIELD AND BACKGROUND OF THE INVENTION

The present invention relates to methods and devices for securing keys for a non-secured, distributed environment with applications to virtualization and cloud-computing security and management.

A trend in modern computer networking, web-, and cloud-computing, is to rely on public, group, shared, or virtualized resources. The IT (information technology) marketplace offers public, private, and hybrid solutions for "virtualization" and "cloud computing." This growing trend is occurring at many levels: infrastructure, platform, and software.

A recurring problem hampering such solutions is the fact that "networked," "virtualized," and/or "cloud" solutions are by their very nature non-secured and distributed. The resources may be physically owned by different entities other than the users, or may be shared among multiple users (having existing security, privacy, and trust concerns). This may occur within one legal entity or among different entities.

For example, a file may be saved in a network "storage cloud." Since the storage cloud is a shared resource, a user is entrusting his/her data to a resource that is routinely accessed by many other users, over which the user has no control at all.

Vendors of network, cloud, and virtualization solutions provide various mechanisms (e.g., authentication, authorization, and virtual private networks) to ameliorate this state of affairs. Such approaches are significant but incomplete. Such mechanisms do not solve various important problems (e.g., encryption at rest, protection of data in use during computation, protection of data when transmitted on the network, single point for security handling, key management, and requiring the user to trust the provider, the provider's implementation, or the provider's staff).

Of course, one solution for the security-conscious consumer is to avoid shared resources altogether. However, such an option is an unpleasant choice for the user, since modern shared resources provide many economic, operational, and technical benefits.

It would be desirable to have methods and devices for securing keys for a non-secured, distributed environment with applications to virtualization and cloud-computing security and management. Such methods and devices would, inter alia, overcome the limitations mentioned above.

SUMMARY OF THE INVENTION

It is the purpose of the present invention to provide methods and devices for securing keys, and other secrets, for a non-secured, distributed environment with applications to virtualization and cloud-computing security and management.

In the interest of clarity, several terms which follow are specifically defined for use herein. The term "virtualization" is used herein to refer to any means of executing software in an environment separated from the underlying hardware resources, including, but not limited to: hardware virtualization, software virtualization, memory virtualization, database virtualization, data virtualization, storage virtualization, application virtualization, desktop virtualization, and network virtualization.

The term "computing resource" is used herein to refer to any computing service which provides data storage, volatile memory, permanent memory, computing and calculation capacity, networking capacity, algorithmic capabilities, software capabilities, and/or software-based objects using hardware or software provided by any service provider.

The term "appliance" is used herein to refer to any software or hardware, which may be embodied on physically separate servers, as agents on existing servers of a network system, as virtual servers, as agents on virtual servers containing additional software, or using any appropriate computational resource available to the system, serving as a cryptographic appliance for the encryption and/or decryption of resources.

The term "customer application" is used herein to refer to a cloud application that is written by customers or other third parties, and may use an appliance to perform secure storage I/O operations; for avoidance of doubt, an appliance may be a software agent installed on the same computing resource as the customer application.

The term "protected item" is used herein to refer to any object which should be encrypted. The term "homomorphic agent" is used herein to refer to an optional server or agent for maintaining an encrypted version of a blinding value, which can be applied and removed on demand by the homomorphic agent.

Furthermore, it is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable a security-conscious consumer to use available public, private, hybrid, or shared resources from providers or vendors, while enjoying full security and control. Preferred embodiments of the present invention provide the ability to secure resources that are non-secured, without impairing the functionality of the resources. Preferred embodiments of the present invention enable non-secured resources to be secured and controlled more completely, while maintaining the benefits of the emerging shared-resource model.

Preferred embodiments of the present invention enable a resource to be encrypted by one entity (i.e., "appliance") in an environment, yet may be decrypted by a different entity (i.e., "appliance"), and that each such encryption or decryption operation may in principal be done by a different entity.

Such appliances are operationally connected to a Protected Virtual Key Manager (PVKM) for providing services to the appliances and to users of the system. Such services can be related to managing the encryption keys of the system, and/or related to enhancing the security of the system. Such service features include, but are not limited to:
- preventing the leakage of customer keys if data and/or the runtime state on an appliance is compromised;
- preventing the leakage of customer keys if data and/or the runtime state on the PVKM is compromised;
- preventing the leakage of customer keys if the PVKM is replaced with malicious or bug-containing code;
- preventing the leakage of customer keys if an appliance is replaced with malicious or bug-containing code;
- preventing the leakage of similar keys present on an appliance if an attacker obtains a customer key present on another appliance; and
- Preventing the leakage of customer keys to an eavesdropper tapping into the network or into any resource in the system.

Preferred embodiments of the present invention are applicable in public, private, and hybrid scenarios in which secure resources may belong to different legal entities.

Other preferred embodiments of the present invention provide secure virtualized key-management system in the form of a key repository, which may store keys used by a consumer without knowing such key's values, and without risk of exposing such key's values.

Other preferred embodiments of the present invention provide algorithmic methods for advanced security applications.

Therefore, according to the present invention, there is provided for the first time a method for securing keys for a non-secure computing-environment, the method including the steps of: (a) providing a security-key framework which is adapted, upon receiving an encryption request for protecting a secret item in the computing-environment, for repetitively encrypting, either iteratively, in parallel, or in combination thereof, the secret item with each of a set of N location-specific secure-keys, wherein each location-specific secure-key of the set corresponds to a respective encryption location, to create an encrypted item; wherein the locations are regions of memory located in computing resources operationally connected to the computing-environment; and (b) concealing through encryption at least one the location-specific secure-key such that the step of concealing is configured: (i) to prevent at least one location-specific secure-key from ever being known in an unconcealed form on any computing resource in any computing-environment during the encrypting; and (ii) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the encrypting and the step of concealing, to be performed while at least one location-specific secure-key is in its concealed form.

Preferably, the step of concealing includes at least one technique selected from the group consisting of: key splitting, key joining, blinding, homomorphic encryption, and any encryption technique known in the art.

Preferably, the security-key framework is further adapted, upon receiving a decryption request for the encrypted item, for repetitively decrypting, either iteratively, in parallel, or in combination thereof, the encrypted item with each of the set of N location-specific secure-keys; and wherein the step of concealing is further configured: (iii) to prevent at least one location-specific secure-key from ever being known in unconcealed form on any computing resource in any computing-environment during the decrypting; and (iv) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the decrypting and the step of concealing, to be performed while at least one location-specific secure-key is in its concealed form.

Most preferably, the method further includes the step of: (c) prior to the encrypting or subsequent to the decrypting, exchanging the secret item with an authorized requester while the secret item remains unknown to the security-key framework, thereby providing a secure, virtualized key-management system.

Preferably, the encrypting and the step of concealing can be performed on any element of a collection of computing resources operationally connected to the computing-environment, wherein the step of concealing is performed differently on each the element, thereby preventing leakage of a concealed key from one the element from compromising any other the element.

According to the present invention, there is provided for the first time a device for securing keys for a non-secure computing-environment, the device including: (a) a server including: (i) a CPU for performing computational operations; (ii) a memory module for storing data; and (iii) a network connection for communicating across a network; and (b) a protection module, residing on the server, configured for: (i) providing a security-key framework which is adapted, upon receiving an encryption request for protecting a secret item in the computing-environment, for repetitively encrypting, either iteratively, in parallel, or in combination thereof, the secret item with each of a set of N location-specific secure-keys, wherein each location-specific secure-key of the set corresponds to a respective encryption location, to create an encrypted item; wherein the locations are regions of memory located in computing resources operationally connected to the computing-environment; and (ii) concealing through encryption at least one location-specific secure-key such that the concealing is configured: (A) to prevent at least one location-specific secure-key from ever being known in an unconcealed form on any computing resource in any computing-environment during the encrypting; and (B) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the encrypting and the concealing, to be performed while at least one location-specific secure-key is in its concealed form.

Preferably, the step of concealing includes at least one technique selected from the group consisting of: key splitting, key joining, key blinding, homomorphic encryption, and any encryption technique known in the art.

Preferably, the security-key framework is further adapted, upon receiving a decryption request for the encrypted item, for repetitively decrypting, either iteratively, in parallel, or in combination thereof, the encrypted item with each of the set of N location-specific secure-keys; and wherein the concealing is further configured: (C) to prevent at least one location-specific secure-key from ever being known in unconcealed form on any computing resource in any computing-environment during the decrypting; and (D) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the decrypting and the concealing, to be performed while at least one location-specific secure-key is in its concealed form.

Most preferably, wherein the protection module is further configured for: (iii) prior to the encrypting or subsequent to the decrypting, exchanging the secret item with an authorized requester while the secret item remains unknown to the security-key framework, thereby providing a secure, virtualized key-management system.

Preferably, the encrypting and the concealing can be performed on any element of a collection of computing resources operationally connected to the computing-environment, wherein the concealing is performed differently on each element, thereby preventing leakage of a concealed key from one element from compromising any other element.

According to the present invention, there is provided for the first time a non-transitory computer-readable medium, having computer-readable code embodied on the non-transitory computer-readable medium, the computer-readable code including: (a) program code for providing a security-key framework which is adapted, upon receiving an encryption request for protecting a secret item in the computing-environment, for repetitively encrypting, either iteratively, in parallel, or in combination thereof, the secret item with each of a set of N location-specific secure-keys, wherein each location-specific secure-key of the set corresponds to a respective encryption location, to create an encrypted item; wherein the locations are regions of memory located in computing resources operationally connected to the computing-environment; and (b) program code for concealing through encryption at least one location-specific secure-key such that the concealing is configured: (i) to prevent at least one location-specific secure-key from ever being known in an unconcealed form on any computing resource in any computing-environment during the encrypting; and (ii) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the encrypting and the concealing, to be performed while at least one location-specific secure-key is in its concealed form.

Preferably, the program code for concealing includes at least one technique selected from the group consisting of: key splitting, key joining, key blinding, homomorphic encryption, and any encryption technique known in the art.

Preferably, the security-key framework is further adapted, upon receiving a decryption request for the encrypted item, for repetitively decrypting, either iteratively, in parallel, or in combination thereof, the encrypted item with each of the set of N location-specific secure-keys; and wherein the program code for concealing is further configured: (iii) to prevent at least one location-specific secure-key from ever being known in unconcealed form on any computing resource in any computing-environment during the decrypting; and (iv) to allow useful mathematical operations, wherein the useful mathematical operations include at least one operation selected from the group consisting of: XOR, addition, subtraction, multiplication, division, modular addition, modular subtraction, modular multiplication, modular division, and combinations thereof, performed as part of the decrypting and the concealing, to be performed while at least one location-specific secure-key is in its concealed form.

Most preferably, the computer-readable code further includes: (c) program code for, prior to the encrypting or subsequent to the decrypting, exchanging the secret item with an authorized requester while the secret item remains unknown to the security-key framework, thereby providing a secure, virtualized key-management system.

Preferably, the encrypting and the program code for concealing can be performed on any element of a collection of computing resources operationally connected to the computing-environment, wherein the program code for concealing is configured to be performed differently on each element, thereby preventing leakage of a concealed key from one element from compromising any other element.

These and further embodiments will be apparent from the detailed description and examples that follow.

BRIEF DESCRIPTION OF THE DRAWINGS

The present invention is herein described, by way of example only, with reference to the accompanying drawing, wherein.

DESCRIPTION OF THE PREFERRED EMBODIMENTS

Figure 1:
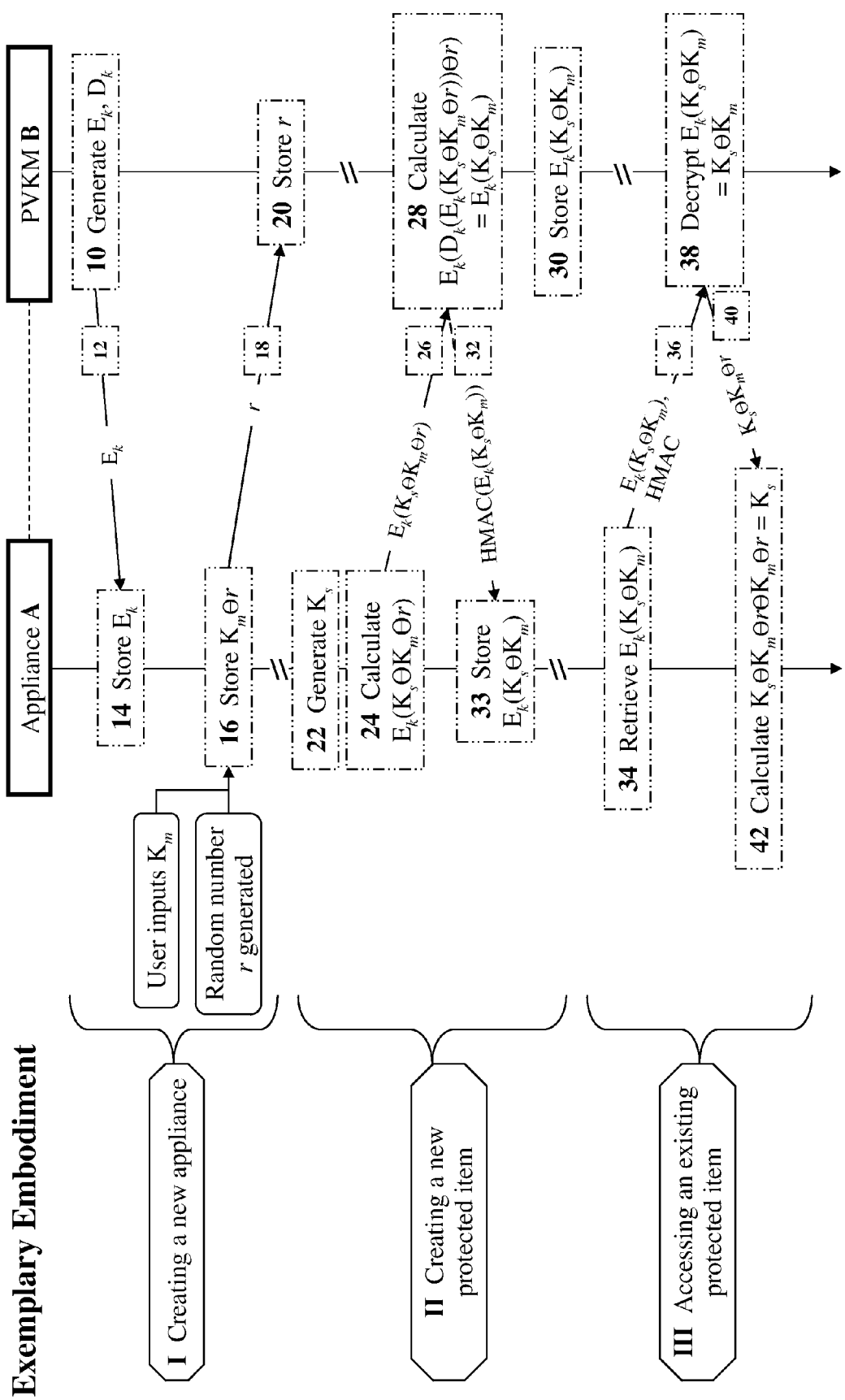
FIG. 1 is a simplified high-level block diagram of the scheme of major operational steps in an exemplary implementation of split-key encryption using a blinded key, according to preferred embodiments of the present invention.

The present invention relates to methods and devices for securing keys for a non-secured, distributed environment with applications to virtualization and cloud-computing security and management. The principles and operation for such methods and devices, according to the present invention, may be better understood with reference to the accompanying description and drawings.

In some preferred embodiments of the present invention, methods and devices for securing keys used in a non-secured environment are provided. As an example, consider a system (e.g., a software application) running in a virtualized or cloud environment. The system includes multiple computing resources, such as servers and storage resources. It is required to occasionally encrypt some of the resources in the system for security.

Encrypted resources may be files, disks, or any resource in the system containing data (e.g., data in server memory is also a "resource" in this context). Resources may be protected through any encryption technique, such as symmetric or asymmetric encryption. These techniques always involve the generation and/or use of cryptographic keys for encryption and decryption. Such cryptographic keys are typically stored for later retrieval such that the system can encrypt and decrypt the resources whenever necessary.

In order to provide a designated service (i.e., encryption and/or decryption of resources), appliances are operationally connected with the servers and resources of the system, as well as with the PVKM which may provide services related to the aforementioned cryptographic keys and the security of the system. Such operational connectivity may include network communication, in-memory communication, or any appropriate communication technique available to the system. Thus, such operational connectivity may also be referred to herein as a communication channel and/or communication.

"Collections" (non-state-interactive groupings) and "clusters" (state-interactive groupings) of appliances are useful in such systems, for example, to ensure fail-over or scalability of the system and its encryption mechanisms. It is often useful that a resource be encrypted by one appliance, yet may be decrypted by a different appliance, and that each such encryption or decryption operation may in principle be done by a different appliance. At the same time, from a security point of view, it is desired that if an attacker compromises one appliance, the entire system is not compromised.

It is noted that while the methods described herein are highly useful in a cluster, they are also useful in a "cluster" of one (i.e., a lone appliance). Clusters are discussed to generalize the applicability, and to emphasize the features of the system; however, the techniques herein are also useful for protecting the keys residing on a single instance of an appliance.

As a general framework to describe the embodiments and implementations detailed below, the following "secret" keys and key elements, inter alia, are relevant to the discussion of the system configuration.

A "specific" key, $K_s$, is a key (or a group of keys) used to encrypt a specific protected resource, employing any encryption technique known in the art. Note that the system is configured to protect multiple such resources, each of which may have a different $K_s$. In preferred embodiments of the present invention, the specific key ($K_s$) does not need to be persistently stored in unencrypted form anywhere.

The specific key, $K_s$ may be split into multiple parts (i.e., two or more). For purposes of clarity, the most general case is used, in the embodiments described below, to split $K_s$ into two parts—a "master key" $K_m$ and a "second key-share." It is understood that implementations using a "third key-share" or even more key-shares have been contemplated within the scope of the present invention.

The following description often refers to mathematical operators $\theta$ and $\cdot$; such operators denote any appropriate operation (e.g., XOR, multiplication modulus p, division modulus p, addition modulus p, and subtraction modulus p). Such mathematical operations are useful, for example, in key joining, key splitting, and blinding. Such operator notation is used to denote these kinds of operations generically. For simplicity, $\theta$ is used to denote both an operation and its inverse in the same equation (e.g., the inverse of XOR is XOR itself, while the inverse of multiplication is division). The same is true for the usage of $\cdot$. Both $\cdot$ and $\theta$ are used, since occasionally it is useful to denote two operations in one equation; sometimes these generalized operators are used in homomorphic operations, such as $E(A) \cdot E(B) = E(A \theta B)$.

The master key, $K_m$, is one key-share of the specific key. Preferred embodiments of the present invention enable the system to be configured such that the master key does not need to be stored in unencrypted form anywhere in any computing system, nor does the master key need to be in unencrypted form in memory anywhere in any computing system.

Such embodiments, in which a key does not need to be stored in unencrypted form anywhere in any computing system, nor does the key need to be in unencrypted form in memory anywhere in any computing system, can be extended to additional keys or key-shares. In the general framework provided below, such aspects have only been applied to the master key for simplicity.

Such aspects, as implemented in the following embodiments, allow the master key or a key-share to be used in mathematical operations, such as key splitting, key joining, or any other relevant mathematical operation, without the key's unencrypted value being known. In some preferred embodiments of the present invention, a blinding value r, is used to prevent keys or key-shares from being stored or in transient memory. Other preferred embodiments implement homomorphic encryption (e.g., using the ElGamal, Paillier, RSA, or Goldwasser-Micali algorithms), using a group of keys denoted "E" or a public/private key-pair denoted ($E_k$, $D_k$), to encrypt and secure keys and key-shares. Other embodiments of the present invention may use any encryption technique known in the art.

Preferred embodiments of the present invention enable some of the keys, such as master keys or key-shares, to reside entirely outside the computing environment, so that they are never known (in a plain, unencrypted form) within the computing environment. Such aspects of embodiments of the present invention enhance security since sensitive keys can be used in the computing environment without ever being in the computing environment in their plain form.

In some embodiments of the present invention blinding values, keys, or key-pairs may be different for each appliance in the system, or even for each resource intended to be protected. Preferred embodiments of the present invention ensure that keys are encrypted differently in their various usages within the computing environment. Such aspects of embodiments of the present invention enhance security, since a theft of one encrypted form does not aid a thief, since the encrypted form—even if stolen—is unusable in any other part of the system.

Preferred embodiments of the present invention enable the establishment of trust within an "imperfectly trusted" environment. Preferred embodiments of the present invention enable keys used in a non-secured environment to be secured.

In the discussion below, the PVKM may be viewed as a "location" (whether physical or virtual) in such an environment, while each appliance and other security element may be viewed as another "location" (whether physical or virtual). However, for the avoidance of doubt, the PVKM itself may be implemented as a collection or a cluster; we will still refer to it as a location for the sake of simplicity.

In some embodiments of the present invention, a split-key encryption approach is implemented with a blinded key which uses a blinding value, r, in order to prevent $K_m$ from being in unencrypted form on the appliance, the PVKM, or anywhere in the computing system.

Referring now to the drawings, FIG. 1 is a simplified high-level block diagram of the scheme of major operational steps in an exemplary implementation of split-key encryption using a blinded key, according to preferred embodiments of the present invention. In FIG. 1, as well as subsequent FIGS. 2-4, the overall process has been depicted according to separate, sequential time lines (going from top to bottom in the drawings) for two primary generalized components, an appliance A and a PVKM B, in order to representationally isolate the parallel processes that are occurring on each component independently.

It is noted that appliance A is intended to be a simplified example of a plurality of appliances in order to provide clarity in the description. It is understood that the present invention has broader applicability to a collection or cluster of such appliances. Furthermore, PVKM B is intended to be one conceptual entity (e.g., a server); however, in practical implementations, PVKM B may be a plurality of servers (e.g., for fail-over protection). In generalizations of this approach, there may be more locations, and therefore more timelines (e.g., timelines for a homomorphic server C and other additional elements).

Moreover, the overall process has been classified into three sub-processes: a Sub-Process I for creating a new appliance, a Sub-Process II for creating a new, protected item, and a Sub-Process III for accessing an existing protected item.

In such blinded-key embodiments, to create a new appliance (Sub-Process I), PVKM B generates a key-pair ($E_k$, $D_k$) (Block Step 10), and transmits the public key $E_k$ to appliance A (Arrow Step 12) for storing (Block Step 14). Standard cryptographic techniques (e.g., wrapping the public key within a so-called "certificate") may be used to guarantee the authenticity of the public key, $E_k$. A blinding value r is used to encrypt and conceal ("blind") the value of $K_m$ on Appliance A; this blinding can be calculated as $K_m \theta r$, where $\theta$ denotes any appropriate operation. The blinded value $K_m \theta r$ is then stored on appliance A (Block Step 16). Such storage can be purely in memory—it does not require disk storage or other permanent storage though these may be allowed in some embodiments.

As an exemplary implementation, appliance A could perform such an operation as the user enters the original input value of $K_m$. In such configurations, a copy of r is sent to (Arrow Step 18), and stored on PVKM B (Block Step 20). The blinding value r is not stored on appliance A; r is erased from memory once the blinded value is calculated, and PVKM B stores a copy of r (Block Step 20).

By performing operations with r and the blinded value $K_m \theta r$ in the protocol described herein, the system can manage keys without $K_m$ or any $K_s$ ever being known on PVKM B, and without $K_m$ being known any more on appliance A after the blinding was performed.

Whenever a new, protected item is created (Sub-Process II), Appliance A generates $K_s$ which is the specific key used to encrypt and protect the item, using any cryptographic technique known in the art.

To store $K_s$ securely, and without exposing neither $K_s$ nor $K_m$, a blinding of the key-share of PVKM B, $K_m \theta K_s \theta r$, is created (Block Step 22), which is then encrypted using $E_k$ (Block Step 24), and sent to PVKM B (Arrow Step 26). PVKM B calculates the non-blinded key share (Block Step 28) using its stored value of r, and stores the non-blinded key-share locally on PVKM B (Block Step 30).

Optionally, Hash-based Message Authentication Code (HMAC) may be used to transmit a modified form of the key-share of PVKM B back to appliance A (Arrow Step 32). With or without HMAC, the non-blinded key-share of PVKM B can be optionally stored on appliance A (Block Step 33) in place of, or in addition to, storing on PVKM B (Block Step 30). The use of HMAC in such implementations is described below.

The operator $\theta$ should be considered an example of possible operations which are useful in such a context.

When the protected item is accessed again (Sub-Process III), the PVKM key-share is retrieved. This may optionally be done on the appliance (in Block Step 34) is retrieved, and transmitted to PVKM B (optionally using HMAC) (Arrow Step 36); or it may be retrieved locally on the PVKM. PVKM B then decrypts the encrypted key-share (Block Step 38). PVKM B finally sends a blinded, decrypted key-share to appliance A (Arrow Step 40) where the decrypted key-share is combined with the appliance's blinded key-share $K_m \theta r$ to recover the storage key, $K_s$ (Block Step 42).

By adding the blinding value, $K_m$ is never stored on the appliance or on the PVKM. Thus, a breach of the appliance does not allow an attacker to recover $K_m$. Equally a breach of the PVKM does not allow an attacker to recover $K_m$.

In some embodiments of the present invention, homomorphic blinding is implemented in two locations using a homomorphic public-key encryption scheme in order to achieve blinding of the master key, $K_m$.

Figure 2:
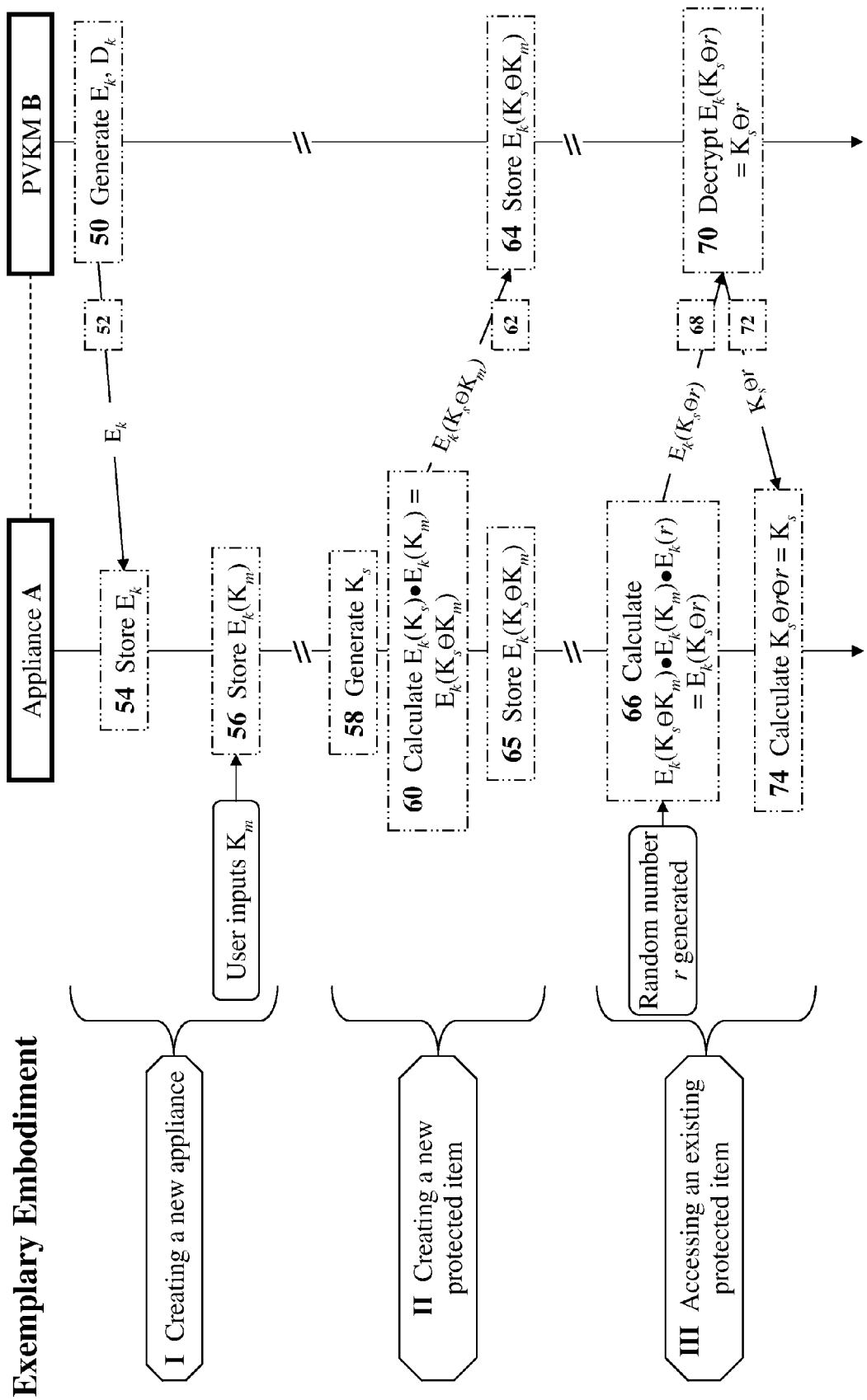
FIG. 2 is a simplified high-level block diagram of the scheme of major operational steps in an exemplary implementation of 2-location, homomorphic-blinding encryption, according to preferred embodiments of the present invention.

FIG. 2 is a simplified high-level block diagram of the scheme of major operational steps in an exemplary implementation of 2-location, homomorphic-blinding encryption, according to preferred embodiments of the present invention.

In such 2-location, homomorphic-blinding embodiments, to create a new appliance (Sub-Process I), PVKM B generates the ($E_k$, $D_k$) key-pair (Block Step 50), and transmits $E_k$ to appliance A (Arrow Step 52) for storing (Block Step 54). The key-pair is for an appropriate partially-homomorphic or fully-homomorphic cryptographic system. Appliance A either encrypts the master key ($K_m$) as soon as the key is received (Block Step 56), or receives the master key already encrypted, but does not send the unencrypted key to PVKM B.

Whenever a new, protected item is created (Sub-Process II), Appliance A generates $K_s$ which is the specific key used to encrypt and protect the item, using any cryptographic technique known in the art.

To store $K_s$ securely, and without exposing neither $K_s$ nor $K_m$, the encrypted key-share of PVKM B of the key, $E_k(K_m \theta K_s)$, is created (Block Step 60). The encrypted key-share is then sent to PVKM B (Arrow Step 62) for storing (Block Step 64). The encrypted key-share of PVKM B can be optionally stored on appliance A (Block Step 65) in place of, or in addition to, storing on PVKM B (Block Step 64).

In such embodiments, the homomorphic property which allows an appliance to multiply cipher-text together without decryption is used. This enables $E_k(K_s \theta K_m)$ to be calculated from $K_s$ and $E_k(K_m)$ without knowing $K_m$: $E_k(K_s) \cdot E_k(K_m) = E_k(K_s \theta K_m)$—as depicted in Block Step 60.

When the protected item is accessed again (Sub-Process III), appliance A first retrieves the encrypted key share $E_k(K_s \theta K_m)$. Appliance A then needs to request PVKM B to decrypt the key, since appliance A does not have $D_k$. However, PVKM B should not be allowed to determine the values of the specific key $K_s$ or the master key $K_m$. To prevent PVKM B from obtaining these keys directly, the specific key is blinded (Block Step 66) with a new random value r known only the appliance, every time the key is sent (Arrow Step 68) to PVKM B for decryption (Block Step 70).

Again, the homomorphic property is used to have appliance A add the blinding to $E_k(K_s)$ without knowing $K_s$ or $K_m$: $E_k(K_s \theta K_m) \cdot E_k(K_m) \cdot E_k(r) = E_k(K_s \theta r)$.

PVKM B then sends the blinded, decrypted key-share to appliance A (Arrow Step 72) where the decrypted key-share is combined with the key-share of appliance A, $K_m$, and the blinding value to recover the storage key, $K_s$ (Block Step 74).

Algorithmically, the same 2-location homomorphic-blinding process may be described as follows. As an example, consider a cryptographic key, S, protecting a sensitive resource, wherein:

$$S = [b_1, b_2, b_3, \ldots b_x].$$

Each "$b_x$" may be a byte or bit of data, for example. If some or all $b_x$ becomes known to an unauthorized entity, then the key is exposed (in whole or in part), and as a result, the sensitive resource is exposed as well. S can be protected by encrypting the string of b-elements up to "$b_x$." S may be encrypted, once or n times, using several different encryption methods $\epsilon=\{E_1, \ldots E_n\}$ and appropriate encryption keys $P=\{P_1, \ldots P_n\}$. It can be defined that:

$$C=\epsilon(S,P)=E_1(E_2(\ldots E_n(S,P_n),\ldots P_2),P_1).$$

In the above expression, P (which is the ordered set of $\{P_1,\ldots P_n\}$) is the secure-key set, and C is the encrypted form of S (i.e., the cipher of S). Each $E_x$ may be any type of encryption known in the art (e.g., a "symmetric" encryption, a public-private scheme, or a key-sharing scheme); and each $P_x$ may be any type of key known in the art (e.g., a symmetric key, a public-private key pair, or a key in a key-sharing scheme).

C may be deciphered with an appropriate decryption "$\delta(\ )$" such that:

$$S=\delta(C,P)=D_n(\ldots D_2(D_1(C,P_1),P_2),\ldots P_n); \text{ and } S=\delta(\epsilon(S,P)).$$

In such an approach, each $D_x$ is the inverse of $E_x$, and $\delta$ is the inverse of $\epsilon$. S is considered secure in such a scheme if the secure key set P is safe, and if the cipher C is deciphered in close proximity to the time and location that S is to be used. In other words, the operation $\delta(\ )$ is applied only when S is actually needed, and the value S is thrown away when it is not needed.

Consider one of the encryption methods $E_k$ (where k is between 1 and n). $E_k$ may be embodied on an appliance as defined above. Supporting a cluster of appliances would require an implementation in which $E_k$ can be embodied on any of the appliances in the cluster. In order to achieve fail-over or scalability for the encryption method, $E_k$ would have to be embodied on all appliances in the cluster.

Consider another encryption method, $E_j$ (where j is different from k, and between 1 and n). The method $E_j$ is embodied on the PVKM. For generality and avoidance of doubt, we make no assumptions regarding the exact location or nature of the PVKM, other than that it is available for communication with the appliance in a secure way, and is able to provide an embodiment of $E_j$. For example, the PVKM may be embodied itself on computing resources such as servers or clusters of servers.

The previous equation for C now become (for j<k):

$$C=\epsilon(S,P)=E_1(E_2(\ldots E_j(\ldots E_k(E_n(S,P_n),\ldots P_k),\ldots P_j),\ldots P_2),P_1).$$

$$S=\delta(C,P)=D_n(\ldots D_k(\ldots D_j(\ldots D_2(D_1(c,P_1),P_2),\ldots,P_j),\ldots,P_k),\ldots,P_n);$$

and $S=\delta(\epsilon(S,P))$.

If j>k, the order of $E_j$ and $E_k$ is reversed, and so is the order of all $D_n$ and $P_n$.

If we disregard methods other than j and k, a simplified notation for the relevant methods in the following discussion are defined as:

$$C=\epsilon(S,P)=E_j(E_k(S,P_k),P_j);$$

$$S=\delta(C,P)=D_k(D_j(C,P_j),P_k); \text{ and } S=\delta(\epsilon(S,P)).$$

wherein the omitted methods are implied.

Recall that S was introduced as a cryptographic key that serves to protect a sensitive resource. The present embodiment seeks to protect S itself. S is available—in its unencrypted form—only in the memory of the appliance, and only when S is in use for encryption or decryption of a sensitive resource. S is never available outside the memory of the appliance (e.g., S is never stored in persistent memory, such as disk storage), and never available on the PVKM.

The PKI (Public-Key Infrastructure) technique involves an encryption algorithm $E_{pki}$ and a decryption algorithm $D_{pki}$. The PKI key-pair includes the public key (e, m) and private key (d, m) as is commonly used in PKI. The private key (d, m) is only found on the PVKM, and is used in the decryption algorithm $D_{pki}(y)=D_{pki}(y(d, m))$. The public key (e, m) may be found on both the PVKM and the appliance, and is used in the encryption algorithm $E_{pki}(x)=E_{pki}(x(e, m))$.

The PKI technique may be any PKI technique common in the art which has a partially-homomorphic or fully-homomorphic behavior (e.g., ElGamal, Paillier, RSA, and Goldwasser-Micali). The actual meaning of e, d, and m depends on the particular technique chosen. For example, in RSA, m is the modulus; e is the encryption exponent; d is the decryption exponent; (e, m) comprises the public key; and (d, m) comprises the private key.

For convenience, the master key M is used herein interchangeably with $K_m$. The PKI-encrypted master key is $\mu=E_{pki}(M)$, and is available only on the particular appliance which participates in the embodiment described below. Note that M is never available anywhere in the system, only μ is available and only on the particular appliance.

A generalized multiplication operator, denoted by "·" (a middle dot), is defined. The actual choice of operation depends on the specific PKI technique used. The operator · selected for this exemplary embodiment is a partially-homomorphic operation appropriate for the PKI technique chosen. For example, in RSA, the operator could be multiplication, while in Goldwasser-Micali, the operator could be a XOR-logic operation. The partially-homomorphic property implies:

$$E_{pki}(x_1) \cdot E_{pki}(x_2) = E_{pki}(x_1 \cdot x_2); \text{ and}$$

$$D_{pki}(y_1 \cdot y_2) = D_{pki}(y_1) \cdot D_{pki}(y_2).$$

The inverse of · is called generalized division, denoted by "/" (a slanted line), and is assumed to exist for the chosen PKI technique. Using such definitions, the encryption techniques $E_j$ and $E_k$, and the decryption techniques $D_k$ and $D_j$ can be described as follows.

To encrypt a resource (e.g., a file stored on a disk) with an encryption technique that depends on S, the following steps are performed.

1. Obtain or generate the cryptographic key S on the appliance (e.g., randomly).
2. Encrypt the resource using S on the appliance.
3. S needs to be stored in a way that does not expose its value; as mentioned above, it is desired that the PVKM and any of the other appliances (or entities in the system) do not obtain S. Therefore:
    a. calculate $\sigma=E_{pki}(S)$ on the appliance;
    b. calculate $\kappa=\sigma \cdot \mu=E_{pki}(S) \cdot E_{pki}(M)$ on the appliance;
    c. send κ to the PVKM (note that this does not reveal S or M to the PVKM); and
    d. calculate $D_{pki}(\kappa)$ only on the PVKM (recall that the private key (d, m) is available on the PVKM), which through homomorphism implies: $D_{pki}(\kappa)=D_{pki}(E_{pki}(S) \cdot E_{pki}(M))=D_{pki}(E_{pki}(S \cdot M))=S \cdot M$. The PVKM can now provide safe-keeping for the value (S·M) by any appropriate technique (e.g., storage in a secure database).
4. Discard the value S so it is no longer available on the appliance, not even in the appliance memory (optionally, the value could be cached for future use, which compromises security in exchange for performance and convenience).

Taken together, the steps above that occur on the appliance describe $E_k$, while the steps that occur on the PVKM describe $E_j$.

To decrypt the above-encrypted resource when S is not available, the following steps are performed.
1. Retrieve S·M on the PVKM.
2. Calculate $\kappa = E_{pki}(S \cdot M)$ on the PVKM.
3. Send $\kappa$ to the appliance.
4. Calculate $\kappa/\mu$ on the appliance through homomorphism and the availability of $E_{pki}(M)$: $\kappa/\mu = E_{pki}(S \cdot M)/E_{pki}(M) = E_{pki}(S) = \sigma$.
5. Produce $\sigma_{blinded}$ from $\sigma$ using any appropriate blinding technique known in the art on $\sigma$; for example, one such technique involves a random r and multiplication by $E_k(r)$ (as described with regard to FIG. 2).
6. Send $\sigma_{blinded}$ from the appliance to the PVKM.
7. Calculate $S_{blinded}$ on the PVKM: $S_{blinded} = D_{pki}(\sigma_{blinded}) = D_{pki}(E_{pki}(S_{blinded}))$.
8. Send $S_{blinded}$ from the PVKM back to the appliance (the PVKM can retrieve S, since the PVKM performed the blinding).
9. Decrypt the desired resource using S on the appliance.
10. Discard the value S so it is no longer available on the appliance, not even in the appliance memory (optionally, the value could be cached for future use, which compromises security in exchange for performance and convenience).

Taken together, the steps above that occur on the appliance describe $D_k$, while the steps that occur on the PVKM describe $D_j$.

Since $K_m$ is only stored in encrypted form, a breach of the appliance does not allow an attacker to recover $K_m$.

In some embodiments of the present invention, homomorphic blinding is implemented in three locations. Such 3-location, homomorphic-blinding embodiments are similar to the process described above regarding split-key encryption using a blinded key, except for the fact that r is never stored in unencrypted form anywhere in the 3-location method. Instead, an encrypted version of r is sent to an external "homomorphic server."

Figure 3:
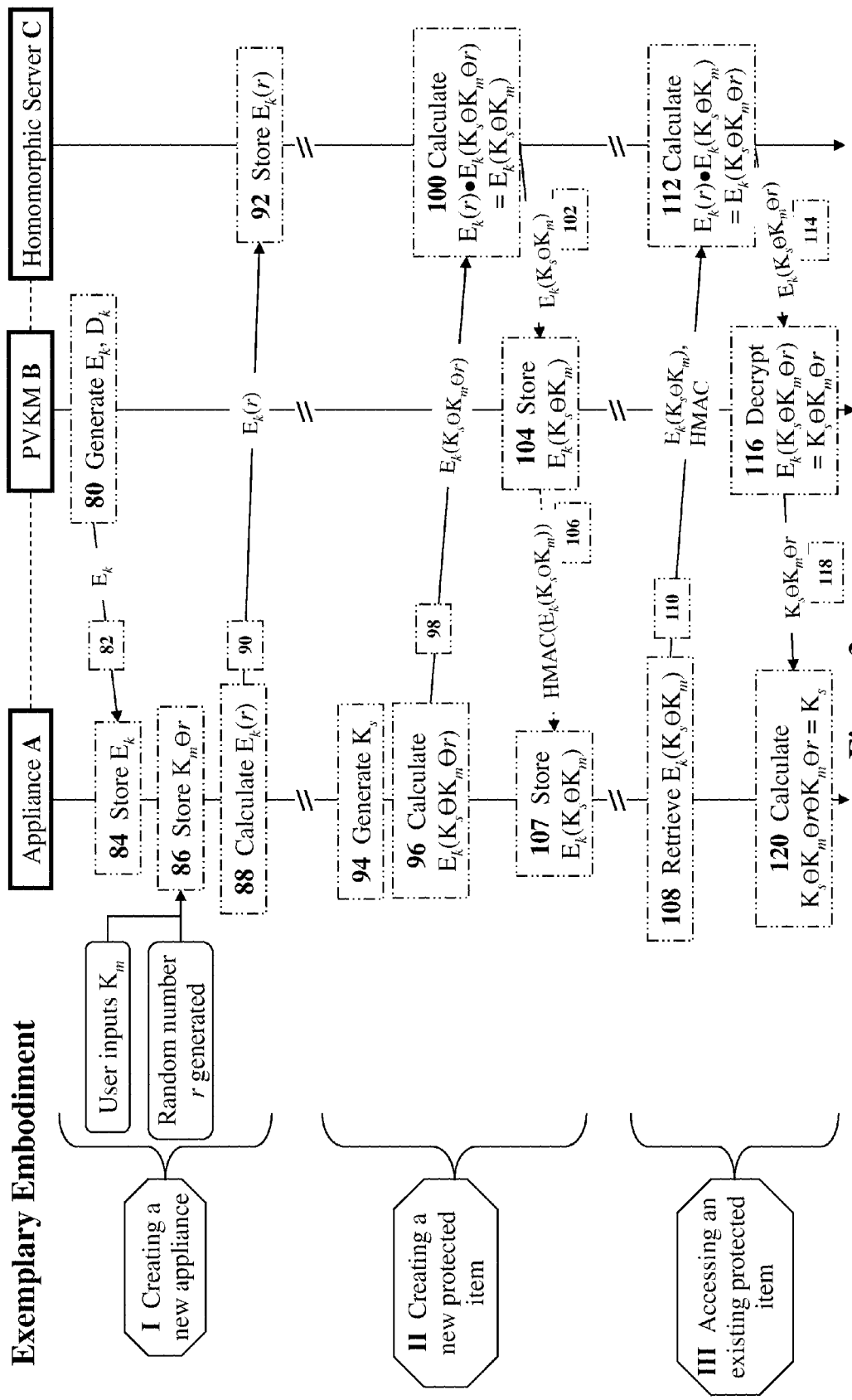
FIG. 3 is a simplified high-level block diagram of the scheme of major operational steps in an exemplary implementation of 3-location, homomorphic-blinding encryption, according to preferred embodiments of the present invention.

FIG. 3 is a simplified high-level block diagram of the scheme of major operational steps in an exemplary implementation of 3-location, homomorphic-blinding encryption, according to preferred embodiments of the present invention.

In such 3-location, homomorphic-blinding encryption, to create a new appliance (Sub-Process I), PVKM B generates the ($E_k$, $D_k$) key-pair (Block Step 80), and transmits $E_k$ to appliance A (Arrow Step 82) for storing (Block Step 84). Appliance A stores $K_m$ blinded (Block Step 86).

As an exemplary implementation, the blinding operation could be performed with a random value r as the user enters the original input value of $K_m$. In such configurations, an encrypted form of r is calculated (Block Step 88), then sent to (Arrow Step 90), and stored on (Block Step 92), a homomorphic server C (neither r nor its encrypted form are stored on appliance A or PVKM B).

Whenever a new, protected item is created (Sub-Process II), Appliance A generates $K_s$ which is the specific key used to encrypt and protect the item, using any cryptographic technique known in the art.

To store $K_s$ securely, and without exposing neither $K_s$ nor $K_m$, the encrypted key-share of PVMK B of the blinded key, $K_m \theta K_s$, is created (Block Step 104), which involves calculating $E_k(K_s \theta K_m \theta r)$ and then sending to homomorphic server C (Arrow Step 98). C calculates the non-blinded key share using its stored encrypted form of r (Block Step 100). The encrypted non-blinded key is then transmitted (Arrow Step 102), and stored locally on PVKM B (Block Step 104).

Optionally, HMAC may be used to transmit a modified form of the key-share calculated in Block Step 100 back to appliance A (Arrow Step 106). With or without HMAC, the encrypted non-blinded key-share of PVKM B can be optionally stored on appliance A (Block Step 107) in place of, or in addition to, storing on PVKM B (Block Step 104).

When the protected item is accessed again (Sub-Process III), the stored encrypted key-share in is retrieved (Block Step 108), and transmitted to homomorphic server C (optionally using HMAC) (Arrow Step 110). FIG. 3 depicts the key-shared being transmitted from appliance A in the case of storage on appliance A (Block Step 107); however, the key-share can be transmitted from PVKM B in the case of storage on PVKM B (Block Step 104). Homomorphic server C then calculates a blinded, encrypted key-share (Block Step 112), and sends the blinded, encrypted key-share to PVKM B (Arrow Step 114). PVKM B finally decrypts the blinded, encrypted key-share (Block Step 116), and sends the blinded, decrypted key-share to appliance A (Arrow Step 118) where the decrypted key-share is combined with the appliance's blinded key-share $K_m \theta r$ to recover the specific key, $K_s$ (Block Step 120).

The homomorphic property of the above encryption method means that the blinding value can be applied to, and removed directly from, the cipher-text without knowing the plain r. Since the value of r is never stored in unencrypted form, a passive attack on the PVKM or the appliance (or even both) cannot reveal r. The only way to reveal the master key would be to exploit all three servers, retrieve $K_m \theta r$ from the appliance, $D_k$ from the PVKM, and $E_k(r)$ from the homomorphic server and combine all three key elements.

In some embodiments of the present invention, 2-location, homomorphic-blinding encryption is implemented with protocol optimizations. Such embodiments are similar to the 2-location homomorphic-blinding encryption described above with regard to FIG. 2, except that the protocol is more efficient in certain places, and can achieve similar goals with fewer calculations and fewer "round trips."

Figure 4:
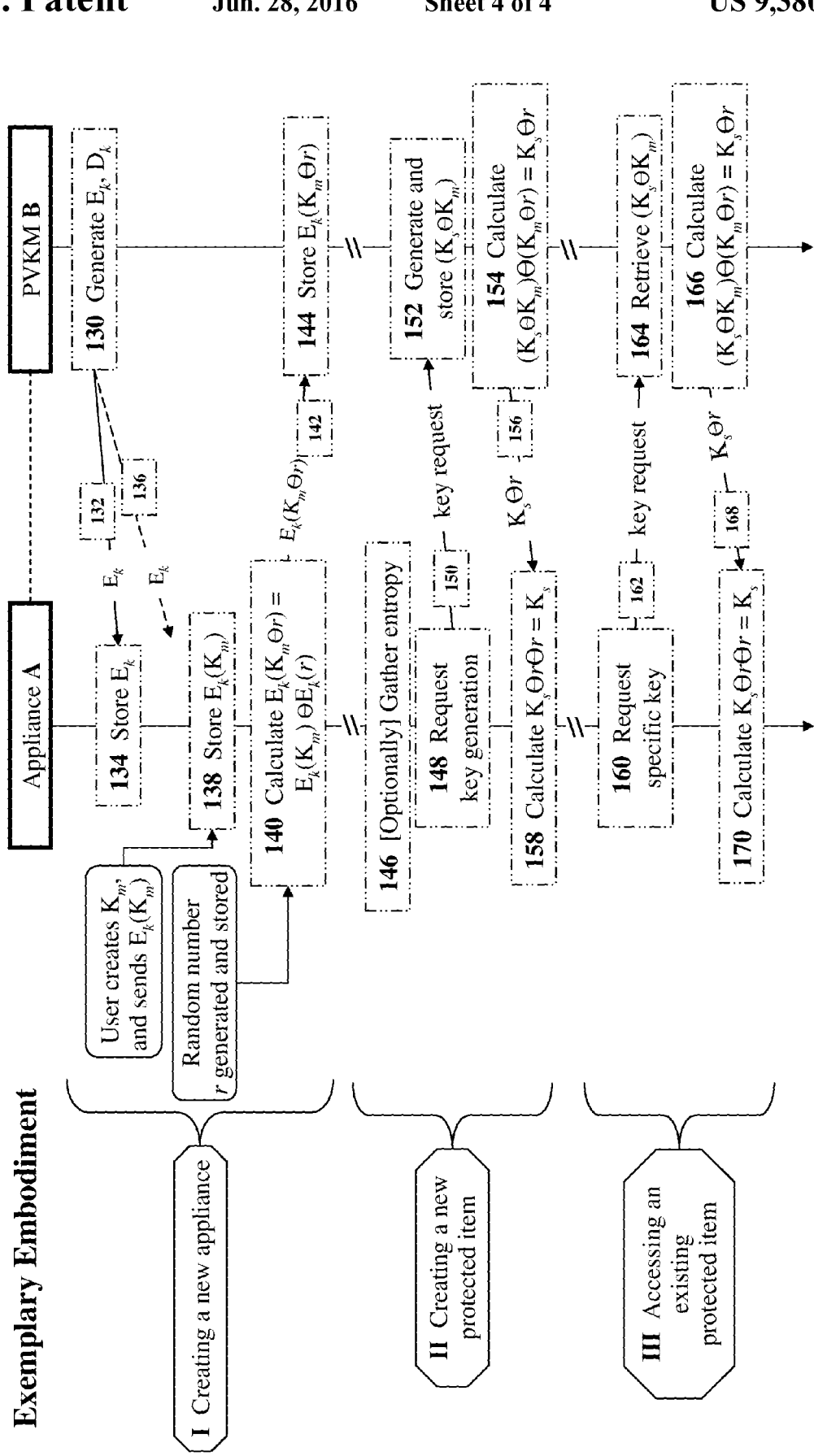
FIG. 4 is a simplified high-level block diagram of the scheme of major operational steps in an exemplary implementation of 2-location, homomorphic-blinding key encryption with protocol optimizations, according to preferred embodiments of the present invention.

FIG. 4 is a simplified high-level block diagram of the scheme of major operational steps in an exemplary implementation of 2-location, homomorphic-blinding encryption with protocol optimizations, according to preferred embodiments of the present invention.

In such 2-location, homomorphic-blinding embodiments, to create a new appliance (Sub-Process I), PVKM B generates the ($E_k$, $D_k$) key-pair (Block Step 130), and transmits $E_k$ to appliance A (Arrow Step 132) for storing (Block Step 134), as well as (optionally) sending $E_k$ to the user (Arrow Step 136) (e.g., to the user's web browser). Appliance A stores the encrypted master key, $E_k(K_m)$, upon receipt (Block Step 138), and then blinds the encrypted $K_m$ (from a generated and stored blinding value r) by calculating $E_k(K_m \theta r)$ (Block Step 140). The blinded, encrypted $K_m$ is then transmitted to PVKM B (Arrow Step 142), and stored on PVKM B (Block Step 144).

The homomorphic property of the above encryption method means that the blinding can be applied without ever knowing $K_m$: $E_k(K_m \theta r) = E_k(K_m) \theta E_k(r)$.

Whenever a new, protected item is created (Sub-Process II), a new, specific key $K_s$, which is the specific key used to encrypt and protect the item, is needed. Any cryptographic technique known in the art can be used. In such embodiments, the specific key is generated as follows.

Appliance A can optionally gather entropy (as known in the art) in the form of random bits on Appliance A (Block Step 146) to be sent with a key-generation request. Appliance A then requests a key to be generated (Block Step 148) by transmitting the request to PVKM B, optionally passing on the gathered entropy (Arrow Step 150). PVKM B then generates a random value, which serves as the key-share of PVKM B, $K_m \theta K_s$, optionally with appliance entropy (Block Step 152).

PVKM B can either use the appliance entropy supplied with the request or PVKM entropy or both for generating the new key. The key-share is then used to generate the blinded key, $K_s \theta r$ (Block Step 154), which is sent from PVKM B to Appliance A (Arrow Step 156), from which Appliance A can calculate the key, $K_s$, using the previously-stored blinding value r (Block Step 158).

When the protected item is accessed again (Sub-Process III), appliance A obtains the specific key, $K_s$, by generating a request (Block Step 160), and transmitting the request to PVKM B (Arrow Step 162). PVKM B retrieves its key-share (Block Step 164), calculates the blinded key (Block Step 166), and transmits the blinded key to appliance A (Arrow Step 168). Appliance A can then calculate the key, $K_s$ (Block Step 170).

In some embodiments of the present invention, an N-location encryption process is implemented in which the embodiments described above can be extended to more locations within the environment. While the exemplary embodiments described above related to 2-location and 3-location encryption, such approaches have been contemplated within the scope of the present invention to extend the applicability to N locations.

In some embodiments of the present invention, HMAC is implemented in order to restrict use of the decryption key $D_k$ maintained by the PVKM in the embodiments described above, both for denial-of-service (DoS) prevention and for security. HMAC is a special checksum mechanism which is easy to calculate for the PVKM, but very difficult to forge by any other entity. Using an HMAC implementation, the PVKM calculates a "ticket" every time the PVKM encrypts data, and sends the data to an appliance together with the cipher-text. The PVKM refuses to decrypt data without a valid ticket. The PVKM can easily calculate the checksum from the cipher-text, enabling the approach to work even if the PVKM does not store the encrypted keys in its database.

In further embodiments of the present invention, the PVKM and appliances are used as a secure, virtualized key-management system, providing encryption keys to a user via an API (Application Programming Interface). In such embodiments, the user is responsible for performing the actual encryption, while the implementation system only provides the keys. In such embodiments, the PVKM, appliances, and the protocols between each of them may be any of the cases described above, or any protocol which falls under the general principals described.

Furthermore, the actual encryption keys supplied to a user in such embodiment may themselves be completely unknown to the implementation system (i.e., completely unknown to the PVKM and the appliances). Such an implementation can be achieved by enhancing the protocol so that the user also participates in the process by requiring the user to issue a blinding value, an encryption key, an encryption key group, or an encryption key-pair of its own.

In such embodiments, the PVKM and the appliances would switch their own encryption of the key and replace it by the encryption specified by the user, without knowing the key. Such embodiments can be implemented such that neither the PVKM nor the appliances know the key value (i.e., via an additional blinding using a blinding value supplied by the user). In such embodiments, a secure, virtualized key-management system can serve as a key-generation and key-storage system on behalf of such users, yet never know the values of the keys that the system serves to the users. Such implementations provide a further security enhancement by ensuring security, since something completely unknown to the system cannot be stolen from the system. In particular, key values cannot be stolen from the temporary memory caches of the system.

While the present invention has been described with respect to a limited number of embodiments, it will be appreciated that many variations, modifications, and other applications of the present invention may be made.

What is claimed is:

1. A method for securing keys for a non-secure computing-environment, the method comprising the steps of:
   (a) initially concealing at least one location-specific secure-key of a set of N location-specific secure-keys to undergo a previous initial concealment, wherein N is a positive whole number greater than one, wherein said at least one location-specific secure-key and at least one respective secure-key value were initially transmitted in concealed form, during said previous initial concealment of said at least one location-specific secure-key, from at least one entity selected from the group consisting of: a user device that initially encrypted a clear form of said at least one location-specific secure-key and a clear form of said at least one respective secure-key value during an initialization phase, and a trusted computing resource; and
   (b) upon receiving from a client computing device an encryption request for protecting a secret item in the computing-environment, creating an encrypted item by repetitively encrypting said secret item with each of said set of N location-specific secure-keys in order:
      (i) to prevent said at least one location-specific secure-key and said at least one respective secure-key value from ever being known in an unconcealed form on any computing resource in any computing-environment other than during said previous initial concealment;
      wherein each said location-specific secure-key of said set corresponds to an exclusive, respective encryption location, wherein said locations are regions of memory located in different, physically-distinct computing resources operationally connected to the computing-environment.

2. The method of claim 1, wherein said previous initial concealment of said at least one location-specific secure-key is performed using at least one technique selected from the group consisting of: blinding encryption, partially-homomorphic encryption, and fully-homomorphic encryption.

3. The method of claim 1, the method further comprising the step of:
   (c) upon receiving from a client computing device a decryption request for said encrypted item, repetitively decrypting said encrypted item with each of said set of N location-specific secure-keys, wherein at least one said location-specific secure-key undergoes previous initial concealment in order:
      (i) to prevent said at least one location-specific secure-key and at least one respective secure-key value from ever being known in an unconcealed form on any computing resource in any computing-environment other than during said previous initial concealment.

4. The method of claim 3, the method further comprising the step of:
   (d) prior to said encrypting or subsequent to said step of decrypting, exchanging said secret item with an authorized requester while said secret item remains unknown to the computing-environment, thereby providing a secure, virtualized key-management system.

5. The method of claim 1, wherein said encrypting and said previous initial concealment of said at least one location-specific secure-key can be performed on any element of a collection of computing resources operationally connected to the computing-environment, and wherein said previous initial concealment is performed differently on each said element, thereby preventing leakage of a concealed key from one said element from compromising any other said element.

6. The method of claim 1, wherein said at least one location-specific secure-key undergoes said previous initial concealment further in order:
  (ii) to allow useful mathematical operations to be performed:
    (A) on an unencrypted value of said secret item while said secret item remains encrypted, and said secret item is never known in an unencrypted form on any computing resource in any computing-environment other than during said previous initial concealment; and
    (B) on unconcealed values of said location-specific secure-keys while said at least one location-specific secure-key remains in a concealed form, and said at least one location-specific secure-key is never known in an unconcealed form on any computing resource in any computing-environment other than during said previous initial concealment; and
  wherein said useful mathematical operations include at least one operation selected from the group consisting of: XOR, addition, subtraction, multiplication, division, modular addition, modular subtraction, modular multiplication, modular division, and combinations thereof.

7. A device for securing keys for a non-secure computing-environment, the device comprising:
  (a) a server including:
    (i) a CPU for performing computational operations;
    (ii) a memory module for storing data; and
    (iii) a network connection for communicating across a network; and
  (b) a protection module, residing on said server, configured for:
    (i) initially concealing at least one location-specific secure-key of a set of N location-specific secure-keys to undergo a previous initial concealment, wherein N is a positive whole number greater than one, wherein said at least one location-specific secure-key and at least one respective secure-key value were initially transmitted in concealed form, during said previous initial concealment of said at least one location-specific secure-key, from at least one entity selected from the group consisting of: a user device that initially encrypted a clear form of said at least one location-specific secure-key and a clear form of said at least one respective secure-key value during an initialization phase, and a trusted computing resource; and
    (ii) upon receiving an encryption request for protecting a secret item in the computing-environment, creating an encrypted item by repetitively encrypting said secret item with each of said set of N location-specific secure-keys in order:
      (A) to prevent said at least one location-specific secure-key and said at least one respective secure-key value from ever being known in an unconcealed form on any computing resource in any computing-environment other than during said previous initial concealment;
    wherein each said location-specific secure-key of said set corresponds to an exclusive, respective encryption location, wherein said locations are regions of memory located in different, physically-distinct computing resources operationally connected to the computing-environment.

8. The device of claim 7, wherein said previous initial concealment of said at least one location-specific secure-key is performed using at least one technique selected from the group consisting of: blinding encryption, partially-homomorphic encryption, and fully-homomorphic encryption.

9. The device of claim 7, wherein said protection module is further configured for:
  (iii) upon receiving from a client computing device a decryption request for said encrypted item, repetitively decrypting said encrypted item with each of said set of N location-specific secure-keys, wherein at least one said location-specific secure-key undergoes previous initial concealment in order:
    (A) to prevent said at least one location-specific secure-key and at least one respective secure-key value from ever being known in an unconcealed form on any computing resource in any computing-environment other than during said previous initial concealment.

10. The device of claim 9, wherein said protection module is further configured for:
  (iv) prior to said encrypting or subsequent to said decrypting, exchanging said secret item with an authorized requester while said secret item remains unknown to the computing-environment, thereby providing a secure, virtualized key-management system.

11. The device of claim 7, wherein said encrypting and said previous initial concealment of said at least one location-specific secure-key can be performed on any element of a collection of computing resources operationally connected to the computing-environment, and wherein said previous initial concealment is performed differently on each said element, thereby preventing leakage of a concealed key from one said element from compromising any other said element.

12. The device of claim 7, wherein said at least one location-specific secure-key undergoes said previous initial concealment further in order:
  (B) to allow useful mathematical operations to be performed:
    (I) on an unencrypted value of said secret item while said secret item remains encrypted, and said secret item is never known in an unencrypted form on any computing resource in any computing-environment other than during said previous initial concealment; and
    (II) on unconcealed values of said location-specific secure-keys while said at least one location-specific secure-key remains in a concealed form, and said at least one location-specific secure-key is never known in an unconcealed form on any computing resource in any computing-environment other than during said previous initial concealment; and
  wherein said useful mathematical operations include at least one operation selected from the group consisting of: XOR, addition, subtraction, multiplication, division, modular addition, modular subtraction, modular multiplication, modular division, and combinations thereof.

13. A non-transitory computer-readable medium, having computer-readable code embodied on the non-transitory computer-readable medium, the computer-readable code comprising:
  (a) program code for initially concealing at least one location-specific secure-key of a set of N location-specific secure-keys to undergo a previous initial concealment, wherein N is a positive whole number greater than one, wherein said at least one location-specific secure-key and at least one respective secure-key value were initially transmitted in concealed form, during said previous initial concealment of said at least one location-specific secure-key, from at least one entity selected from the group consisting of: a user device that initially encrypted a clear form of said at least one location-specific secure-key and a clear form of said at least one respective secure-key value during an initialization phase, and a trusted computing resource; and (b) program code for, upon receiving from a client computing device an encryption request for protecting a secret item in a computing-environment, creating an encrypted item by repetitively encrypting said secret item with each of said set of N location-specific secure-keys in order:

(i) to prevent said at least one location-specific secure-key and said at least one respective secure-key value from ever being known in an unconcealed form on any computing resource in any computing-environment other than during said previous initial concealment;

wherein each said location-specific secure-key of said set corresponds to an exclusive, respective encryption location, wherein said locations are regions of memory located in different, physically-distinct computing resources operationally connected to the computing-environment.

14. The non-transitory computer-readable medium of claim 13, wherein said previous initial concealment includes at least one technique selected from the group consisting of: blinding encryption, partially-homomorphic encryption, and fully-homomorphic encryption.

15. The non-transitory computer-readable medium of claim 13, the computer-readable code further comprising:

(c) program code for, upon receiving a decryption request for said encrypted item, for repetitively decrypting said encrypted item with each of said set of N location-specific secure-keys, wherein at least one said location-specific secure-key undergoes previous initial concealment in order:

(i) to prevent said at least one location-specific secure-key and at least one respective secure-key value from ever being known in unconcealed form on any computing resource in any computing-environment other than during said previous initial concealment.

16. The non-transitory computer-readable medium of claim 15, the computer-readable code further comprising:

(d) program code for, prior to said encrypting or subsequent to said decrypting, exchanging said secret item with an authorized requester while said secret item remains unknown to said computing-environment, thereby providing a secure, virtualized key-management system.

17. The non-transitory computer-readable medium of claim 13, wherein said encrypting and said previous initial concealment of said at least one location-specific secure-key can be performed on any element of a collection of computing resources operationally connected to said computing-environment, wherein said previous initial concealment is configured to be performed differently on each said element, thereby preventing leakage of a concealed key from one said element from compromising any other said element.

18. The non-transitory computer-readable medium of claim 13, wherein said at least one location-specific secure-key undergoes said previous initial concealment further in order:

(ii) to allow useful mathematical operations to be performed:

(A) on an unencrypted value of said secret item while said secret item remains encrypted, and said secret item is never known in an unencrypted form on any computing resource in any computing-environment other than during said previous initial concealment; and (B) on unconcealed values of said location-specific secure-keys while said at least one location-specific secure-key remains in a concealed form, and said at least one location-specific secure-key is never known in an unconcealed form on any computing resource in any computing-environment other than during said previous initial concealment; and wherein said useful mathematical operations include at least one operation selected from the group consisting of: XOR, addition, subtraction, multiplication, division, modular addition, modular subtraction, modular multiplication, modular division, and combinations thereof.

* * * * *